(12) United States Patent
Horjus

(10) Patent No.: US 10,807,894 B2
(45) Date of Patent: Oct. 20, 2020

(54) CONTINUOUS PROCESS FOR THE TREATMENT OF WASTEWATER

(71) Applicant: HaskoningDHV Nederland B.V., Amersfoort (NL)

(72) Inventor: Frans Wierd Horjus, Zutphen (NL)

(73) Assignee: HASKONINGDHV NEDERLAND B.V., Amersfoort (NL)

( * ) Notice: Subject to any disclaimer, the term of this patent is extended or adjusted under 35 U.S.C. 154(b) by 48 days.

(21) Appl. No.: 15/751,507

(22) PCT Filed: Jul. 28, 2016

(86) PCT No.: PCT/EP2016/068055
§ 371 (c)(1),
(2) Date: Feb. 9, 2018

(87) PCT Pub. No.: WO2017/025345
PCT Pub. Date: Feb. 16, 2017

(65) Prior Publication Data
US 2018/0230034 A1    Aug. 16, 2018

(30) Foreign Application Priority Data

Aug. 10, 2015 (NL) .................................... 2015286

(51) Int. Cl.
*C02F 3/34* (2006.01)
*C02F 3/12* (2006.01)
(Continued)

(52) U.S. Cl.
CPC ............... *C02F 3/348* (2013.01); *B03D 3/00* (2013.01); *C02F 3/121* (2013.01); *C02F 3/1221* (2013.01);
(Continued)

(58) Field of Classification Search
CPC ........ C02F 3/348; C02F 3/2846; C02F 3/302; C02F 3/1236; C02F 3/1221; C02F 3/121;
(Continued)

(56) References Cited

U.S. PATENT DOCUMENTS 7,459,076 B2 * 12/2008 Cote ....................... C02F 3/223
210/189
8,721,877 B2 * 5/2014 Buchmueller .......... C02F 3/006
210/120
(Continued)

FOREIGN PATENT DOCUMENTS

| JP | 2008-284427 A | 11/2008 |
| WO | WO-98/37027 | 8/1998 |

(Continued)

OTHER PUBLICATIONS

International Search Report issued in International Patent Application No. PCT/EP2016/068055 dated Sep. 2, 2016.

*Primary Examiner* — Nam X Nguyen
*Assistant Examiner* — Julia L. Wun
(74) *Attorney, Agent, or Firm* — Foley & Lardner LLP

(57) ABSTRACT

A process for the treatment of wastewater is disclosed, which comprises (a) contacting the wastewater with fast settling sludge from step (c) in an anaerobic zone, obtaining a mixture of wastewater and sludge; (b) subjecting the mixture from step (a) and slow settling sludge from step (c) to an aerobic zone, obtaining a water and sludge mixture; (c) subjecting a first part of the mixture from step (b) to a sludge selection step, wherein sludge is selected based on settling velocity and a first portion containing slow settling sludge and a second portion containing fast settling sludge are collected, wherein average settling velocity of the fast settling sludge is greater than that of the slow settling sludge, and wherein the first portion is returned to step (b) and the
(Continued)

second portion is returned to step (a); and (d) separating sludge from a second part of the mixture from step (b).

15 Claims, 1 Drawing Sheet

(51) Int. Cl.
    *C02F 3/30*         (2006.01)
    *C02F 3/28*         (2006.01)
    *B01D 21/00*       (2006.01)
    *B03D 3/00*         (2006.01)
    *C02F 101/10*      (2006.01)

(52) U.S. Cl.
    CPC .......... C02F 3/1236 (2013.01); C02F 3/2846 (2013.01); C02F 3/302 (2013.01); *B01D 21/0045* (2013.01); *C02F 2101/105* (2013.01); *C02F 2203/004* (2013.01); *C02F 2301/043* (2013.01); *C02F 2301/046* (2013.01); *C02F 2303/06* (2013.01); *Y02W 10/15* (2015.05)

(58) Field of Classification Search
    CPC .......... C02F 2301/046; C02F 2301/043; C02F 2101/105; C02F 2303/06; C02F 2203/004; Y02W 10/15; B01D 21/0045; B01D 21/0057; B03D 3/00
    USPC ....... 210/605, 607, 609, 620, 622–624, 630, 210/800
    See application file for complete search history.

(56) References Cited

U.S. PATENT DOCUMENTS

| 2009/0050562 | A1* | 2/2009 | Novak | C02F 3/12 210/627 |
|---|---|---|---|---|
| 2012/0006745 | A1* | 1/2012 | Kaley | C02F 3/12 210/605 |
| 2014/0083936 | A1 | 3/2014 | Murthy et al. | |
| 2014/0144836 | A1 | 5/2014 | Nyhuis et al. | |
| 2014/0305867 | A1* | 10/2014 | Nyhuis | C02F 3/307 210/626 |
| 2015/0068976 | A1 | 3/2015 | Lemaire et al. | |
| 2015/0336827 | A1* | 11/2015 | Boltz | C02F 3/30 210/610 |

FOREIGN PATENT DOCUMENTS

| WO | WO-01/83382 A1 | 11/2001 |
|---|---|---|
| WO | WO-2004/024638 A1 | 3/2004 |
| WO | WO-2008/141413 A1 | 11/2008 |

\* cited by examiner

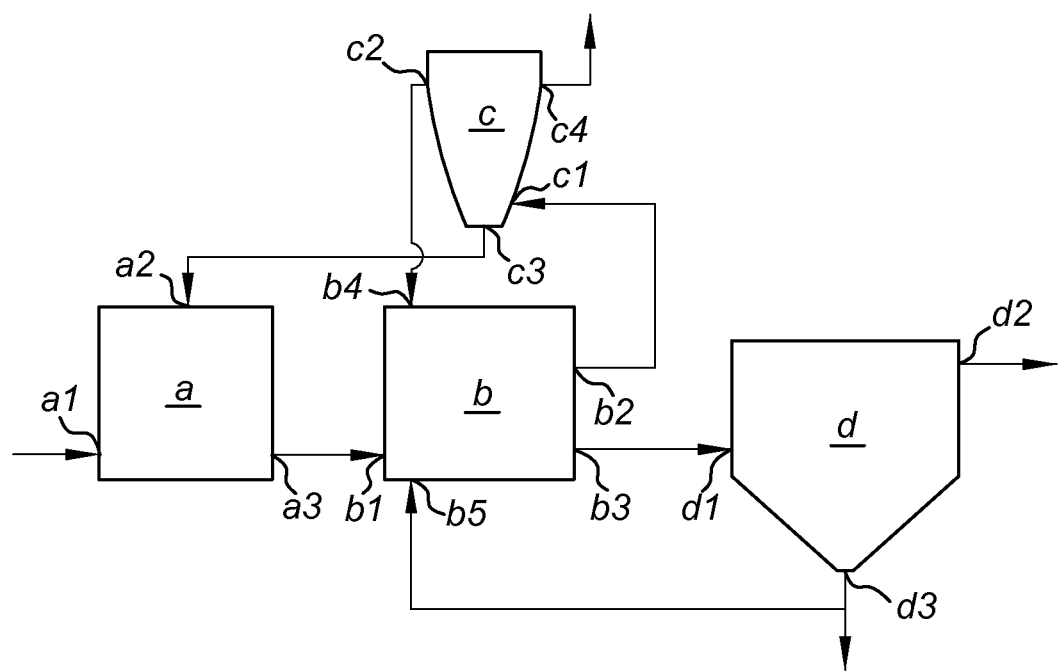

CONTINUOUS PROCESS FOR THE TREATMENT OF WASTEWATER

CROSS-REFERENCE TO RELATED APPLICATIONS

This application is the National Phase of International Patent Application No. PCT/EP2016/068055, filed Jul. 28, 2016, published on Feb. 16, 2017 as WO 2017/025345 A1, which claims priority to Netherlands Patent Application No. 2015286, filed Aug. 10, 2015. The contents of these applications are herein incorporated by reference in their entirety.

The present invention relates to an improved process for the treatment of wastewater, in particular for the secondary treatment of wastewater using microorganisms, and to a system for performing the process.

BACKGROUND

Wastewater treatment typically involves several stages. During primary treatment, heavy solids settle on the bottom of a basin and light oily materials accumulate on the surface of the water. Heavy solids and light oils are removed and the primary-treated wastewater is subjected to secondary treatment, wherein dissolved and suspended biological material is removed. Secondary treatment is typically performed using microorganisms that convert the biological material to sludge. Typically, secondary treatment is combined with tertiary treatment, wherein pollutants such as phosphates and nitrates are removed by microorganisms. A combined secondary and tertiary treatment of wastewater typically involves an anaerobic zone, an anoxic zone and an aerobic zone, wherein wastewater is contacted with active sludge. The microorganisms present in the sludge effectuate sludge growth, wherein organic matter is converted into sludge. Surplus sludge is separated from the treated water by settlement and subsequently discharged from the wastewater treatment plant as waste.

Processes for the treatment of wastewater are for example known from WO 2008/141413, wherein a mixture of wastewater and sludge, downstream of the anaerobic and aerobic zones, is led to a fast settler which operates discontinuously. Settled sludge is transferred to the anaerobic zone and the remainder of the mixture is led to a second settler. An alternative wastewater treatment system is described in US 2014/0144836, wherein part of the sludge formed in the process is subjected to a gravimetric selector. The heavy sludge is fed back to the process while the light sludge is subjected to post-treatment. The remaining part of the mixture of sludge and water is led to a settler and the sludge settled therein is recycled to the start of the treatment process.

JP 2008/284427 discloses a wastewater treatment method wherein fermented raw sludge is separated from the organic wastewater to generate an organic acid, and which organic acids are used to stably and efficiently produce a granular sludge. There is no separation in until after the final sedimentation step, and this is preceded by a granule outflow preventing section which is there to filter out granules having a size bigger than 0.5 mm. After filtering out the larger parts, all of the sludge is returned to biological treatment and granule formation/production.

Nowadays, the formation of sludge granules, opposed to sludge flocs, is considered optimal for the treatment of wastewater. Granular sludge has excellent settling properties. As granular sludge settles many orders of magnitude more quickly than sludge flocs, thus eliminating the need for huge settling tanks wherein the treated wastewater has to reside for many hours (typically at least 4 h) to be able to separate it from the sludge. Using granular sludge may reduce the area of a wastewater treatment plant to only one fifth of the original area, which dramatically reduces the environmental impact of such a plant. The formation of granular sludge is known for batch-wise wastewater treatment processes, e.g. from WO 98/37027 and WO 2004/024638, and has been successfully implemented in the Nereda wastewater treatment process. Ever since the first formation of granular sludge, the field has sought for means to enable the formation of granular sludge in a continuous wastewater treatment process. To date, no such means have been found. The present invention provides in the need for a continuous wastewater treatment process wherein granular sludge is formed and/or maintained.

SUMMARY OF THE INVENTION

The invention relates to an improved process for the treatment of wastewater. The inventors surprisingly found that wastewater may be treated in continuous fashion while at the same time sludge granules are formed and/or maintained within the wastewater treatment system. Such a continuously operable process for the treatment of wastewater wherein sludge granules are effectively formed and maintained is unprecedented in the art. The invention further concerns a system for performing the process according to the invention.

The process according to the invention comprises an anaerobic step (a), an aerobic step (b), a sludge selection step (c) and a sludge removal step (d). The process involves the selection of fast settling sludge from a part of the sludge originating from aerobic step (b) and returning that sludge to the anaerobic zone of step (a) where it is contacted with incoming wastewater. Slow settling sludge is not returned to the anaerobic zone, but instead to the aerobic zone of step (b). As such, the total sludge content within the system is guaranteed and at the same time the growth of fast settling sludge is promoted while the growth of slow settling sludge is not. Compared to conventional wastewater treatment, the present process differs in at least one or two aspects. First of all, only part of the sludge is subjected to a recycle step (sludge selection step (c) with recycles to steps (a) and (b)) and secondly the recycled fast settling sludge is returned to specifically the anaerobic zone, and not to a different zone of the wastewater treatment system. The inventors surprisingly found that when these two features are combined in a continuous process for wastewater treatment, granular sludge is formed. Prior art wastewater treatment processes, wherein fast settling sludge is not specifically returned to the anaerobic zone, does not stimulate the growth of specifically this fast settling sludge, such that granular sludge is not formed therein.

The process according to the invention is a major improvement over prior art continuous wastewater treatment processes. The improvement over prior art processes mainly resides in that granular sludge is formed and maintained within the system, which provides the present process and system with several advantages. First of all, the settling of step (d) may be drastically down-scaled, as granular sludge settles markedly more quickly than sludge flocs. Additionally, the settling of step (d) may employ an (increased) upflow. Prior art processes do not employ such an upflow, or only at a very low upflow speed. A faster upflow may be used in the present process while still maintaining effective separation of sludge and treated water. Secondly, the use of an anoxic tank in between the anaerobic and aerobic zone as well as water/sludge recycles from the aerobic zone to the anoxic zone and the anaerobic zone are not required while complete removal of nitrogen compounds from the wastewater is still possible. Also, the volume of the anaerobic tank may be greatly reduced, as the sludge subjected to the anaerobic zone is a concentrated stream of granular sludge, compared to diluted floccular sludge in prior art processes. This all is combined with a continuously and stable operable process, wherein granular sludge is readily maintained. These advantages lead to a dramatic simplification of wastewater treatment plants, while keeping the efficacy in purifying the incoming wastewater unabatedly high.

LIST OF PREFERRED EMBODIMENTS

1. A process for the treatment of wastewater, comprising:
   (a) contacting the wastewater with fast settling sludge originating from step (c) in an anaerobic zone, to obtain a mixture of wastewater and sludge;
   (b) subjecting the mixture originating from step (a) and slow settling sludge originating from step (c) to an aerobic zone to obtain a mixture of water and sludge;
   (c) subjecting a first part of the mixture originating from step (b) to a sludge selection step, wherein sludge is selected based on settling velocity and a first portion containing slow settling sludge and a second portion containing fast settling sludge are collected, wherein the average settling velocity of the fast settling sludge is greater than the settling velocity of the slow settling sludge, and wherein the first portion is returned to step (b) and the second portion is returned to step (a); and
   (d) separating sludge from a second part of the mixture originating from step (b), to obtain treated wastewater.
2. Process according to embodiment 1, wherein the sludge selection of step (c) is performed in an upflow reactor, which is preferably operated with an upflow in the range of 1-25 m/h.
3. Process according to embodiment 1 or 2, wherein step (c) operates with a substantially constant feed rate of the first part of the mixture of step (b).
4. Process according to any of the preceding embodiments, which is operated continuously.
5. Process according to any of the preceding embodiments, wherein in step (c) a third portion containing slow settling sludge is collected, which is discharged as waste sludge.
6. Process according to any of the preceding embodiments, wherein the mixture transfers barrier-free from step (a) to (b), from step (b) to (c) and from step (b) to (d).
7. Process according to any of the preceding embodiments, wherein at least part of the sludge originating from step (d) is returned to step (b).
8. Process according to any of the preceding embodiments, wherein the third portion of the sludge originating from step (c) and/or at least part of sludge originating from step (d) are subjected to sludge treatment.
9. System for carrying out the process according to any one of embodiments 1-8, comprising:
   (a) an anaerobic tank, comprising one or more inlets for receiving wastewater and for receiving fast settling sludge originating from outlet (c3) and an outlet (a3) for discharging a mixture of wastewater and sludge to tank (b);
   (b) an aerobic tank, comprising an inlet (b1) for receiving the mixture of wastewater and sludge originating from outlet (a3), an outlet (b2) for discharging a first part of a mixture of water and sludge to sludge selector (c), an outlet (b3) for discharging a second part of the mixture of water and sludge to separator (d) and an inlet (b4) for receiving a mixture of slow settling sludge originating from outlet (c2);
   (c) a sludge selector, comprising an inlet (c1) for receiving the first part of the mixture of water and sludge originating from outlet (b2), an outlet (c2) for discharging a first portion of slow settling sludge to tank (b) and an outlet (c3) for discharging a second portion of fast settling sludge to tank (a) and means (c4) for selecting sludge based on settling velocity; and
   (d) a separator for separating sludge from a mixture of sludge and water, comprising an inlet (d1) for receiving the second part of the mixture originating from outlet (b3), a first outlet (d2) for discharging treated water and a second outlet (d3) for discharging separated sludge, wherein outlet (a3) is in fluid connection with inlet (b1), outlet (b2) is in fluid connection with inlet (c1), outlet (b3) is in fluid connection with inlet (d1), outlet (c2) is in fluid connection with inlet (b4) and outlet (c3) is in fluid connection with an inlet of unit (a).
10. System according to embodiment 9, wherein unit (a) comprises two inlets, a first inlet (a1) for receiving wastewater and a second inlet (a2) for receiving fast settling sludge originating from outlet (c3), and wherein outlet (c3) is in fluid connection with inlet (a2).
11. System according to embodiment 9 or 10, wherein sludge selector (c) is integrated in aerobic tank (b).
12. System according to any one of embodiments 9-11, wherein sludge selector (c) is an upflow reactor capable of operating with an upflow speed of 1-25 m/h, preferably an upflow speed varying in the range of 1-25 m/h.
13. System according to any one of embodiments 9-12, wherein the fluid connection between outlet (c3) and inlet (a2) is equipped with a pump employing an upward stream of air or liquid or a screw pump.
14. System according to any one of embodiments 9-13, wherein separator (d) is an upflow reactor capable of operating with an upflow speed of 0.5-10 m/h.
15. System according to any one of embodiments 9-14, wherein outlet (a3) together with inlet (b1) take the form of an opening in the bottom part of a wall separating tanks (a) and (b).

BRIEF DESCRIPTION OF THE FIGURE

FIG. 1 displays the system, which comprises:
(a) an anaerobic tank, comprising one or more inlets for receiving wastewater and for receiving fast settling sludge originating from outlet (c3) and an outlet (a3) for discharging a mixture of wastewater and sludge to tank (b);
(b) an aerobic tank, comprising an inlet (b1) for receiving the mixture of wastewater and sludge originating from outlet (a3), an outlet (b2) for discharging a first part of a mixture of water and sludge to sludge selector (c), an outlet (b3) for discharging a second part of the mixture of water and sludge to separator (d) and an inlet (b4) for receiving a mixture of slow settling sludge originating from outlet (c2);
(c) a sludge selector, comprising an inlet (c1) for receiving the first part of the mixture of water and sludge originating from outlet (b2), an outlet (c2) for discharging a first portion of slow settling sludge to tank (b) and an outlet (c3) for discharging a second portion of fast settling sludge to tank (a) and means (c4) for selecting sludge based on settling velocity; and (d) a separator for separating sludge from a mixture of sludge and water, comprising an inlet (d1) for receiving the second part of the mixture originating from outlet (b3), a first outlet (d2) for discharging treated water and a second outlet (d3) for discharging separated sludge.

DETAILED DESCRIPTION

The present invention relates to an improved process for the treatment of wastewater, and to a system designed to perform the process according to the invention. The skilled person will appreciate that all said below for the process according to the invention equally applies to the system according to the invention and vice versa.

Process

The process according to the invention comprises:
(a) contacting the wastewater with fast settling sludge originating from step (c) in an anaerobic zone, to obtain a mixture of wastewater and sludge;
(b) subjecting the mixture originating from step (a) and slow settling sludge originating from step (c) to an aerobic zone to obtain a mixture of water and sludge;
(c) subjecting a first part of the mixture originating from step (b) to a sludge selection step, wherein sludge is selected based on settling velocity and a first portion containing slow settling sludge and a second portion containing fast settling sludge are collected, wherein the average settling velocity of the fast settling sludge is greater than the settling velocity of the slow settling sludge, and wherein the first portion is returned to step (b) and the second portion is returned to step (a); and
(d) separating sludge from a second part of the mixture originating from step (b), to obtain treated wastewater.

In one embodiment, step (b) is performed directly following step (a), without any significant further alterations to the mixture of wastewater and sludge obtained in step (a). In one embodiment, step (c) is performed directly following step (b), without any significant further alterations to the first part of the mixture of water and sludge obtained in step (b). In one embodiment, step (d) is performed directly following step (b), without any significant further alterations to the second part of the mixture of water and sludge obtained in step (b). In one embodiment, step (a) is performed directly following step (c), without any significant further alterations to the second portion containing fast settling sludge obtained in step (c). In one embodiment, step (b) is performed directly following step (c), without any significant further alterations to the first portion containing slow settling sludge obtained in step (c). In one embodiment, the mixture that is obtained in step (a) is substantially wholly formed by incoming wastewater and the fast settling sludge originating from step (c). In one embodiment, the mixture that is obtained in step (b) is substantially wholly formed by the mixture originating from step (a), the slow settling sludge originating from step (c) and optionally sludge originating from step (d). In one embodiment, the sludge of the first portion is slow settling sludge and the first portion could also be referred to as the first portion of slow settling sludge. In one embodiment, the sludge of the second portion is fast settling sludge and the second portion could also be referred to as the second portion of fast settling sludge. In one embodiment, the sludge of the optionally obtained third portion is slow settling sludge and the third portion could also be referred to as the third portion of slow settling sludge.

In the process of the invention, wastewater undergoes conventional wastewater purification with microorganisms, involving phosphate removal, nitrification and denitrification employing an anaerobic and an aerobic zone as known in the art. In the process according to the invention, wastewater is contacted with fast settling sludge in the anaerobic zone of step (a). Even though one of the major advantages of the process according to the invention is that it may be performed continuously, a batches-wise performance is not excluded. Furthermore, the inventors found that continuous operation, in particular continuous feeding of fast settling sludge to the anaerobic zone, further optimizes the formation and maintenance of granular sludge within the system. Continuous nutrient uptake in the anaerobic zone was found to promote granular sludge formation most optimally. Thus, the present process is preferably a continuous process. Herein, wastewater is continuously fed to step (a) of the process of the invention, while treated water is continuously discharged from step (d). When the (waste)water proceeds through the process, in particular steps (a), (b) and (d), microorganisms present in the sludge convert organic matter present in the wastewater into further sludge. During especially steps (a) and (b) of the process according to the invention, the conditions are such that the growth of the sludge is promoted. Thus, the amount of sludge is increased while only part of the sludge is needed to keep the process running Thus, in step (c), the sludge that is best suited to keep the process running, fast settling sludge, is selected and returned to step (a). This fast settling sludge, obtained as second portion in step (c), is granular and has excellent settling properties. The remaining of the sludge, which settles more slowly and which is obtained as first (and optionally third) portion in step (c) and as separated sludge in step (d), is typically fed to the aerobic zone of step (b) and/or may be discharged from the process. One of the surprising advantages of the process according to the invention is that in step (c), the best sludge for running the process is selected and returned to step (a). Moreover, this is accomplished while not the complete sludge fraction present at the end of step (b) has to be subjected to such sludge selection, but only part thereof needs to be subjected to sludge selection step (c). Sludge selection step (c) can for example be performed in an upflow reactor with a rather high upflow speed, as further described below, while keeping the separation of desired, fast settling, granular sludge from the undesired, slow settling, floccular sludge optimal.

Thus, in the process of the invention, fast settling sludge or "heavy sludge" (the second portion originating from step (c)) is mixed with the incoming wastewater, thus forming a mixture of wastewater and sludge. This mixture may be formed directly in the anaerobic zone or a separate selector may be present upstream of the anaerobic zone wherein the sludge and incoming wastewater are mixed prior to being fed to the anaerobic zone. The mixture of sludge and wastewater resides in the anaerobic zone of step (a) for a certain amount of time. To the aerobic zone of step (b), a portion of sludge (the first portion originating from step (c)) is added to the mixture originating from step (a). This portion typically contains mainly non-granular sludge, as it concerns the slow settling sludge or "light sludge" from selection step (c). Also, the water that resides in step (b) is already partly treated, as the majority of the organic matter is taken up by the sludge in step (a). Thus, the mixture that resides in the aerobic zone of step (b) is referred to as a mixture of sludge and water.

In one embodiment, the process is advantageously started by mixing the first batch of incoming wastewater with sludge comprising 25-80 wt %, more preferably 40-60 wt % of fast settling sludge according to the invention in step (a). A maximum is preferred in order to optimize the burden of transport. A minimum relative amount of fast settling sludge helps optimizing the amount of heavy sludge obtained in step (c), thus rendering it possible to work with reduced size and complexity of sludge selectors in step (c).

The wastewater to be treated with the process according to the invention or in the system according to the invention typically contains an organic nutrient (organic matter). Typically, the biochemical oxygen demand (BOD) of the incoming wastewater is at least 50 mg/L, such as 100-10000 mg/L. Any type of wastewater, such as sewage water, may be treated according to the invention. The process according to the invention may thus also be referred to as sewage treatment. The wastewater subjected to the process according to the invention may be pretreated prior to step (a), such as wastewater that has received a primary treatment as known in the art, although primary treatment will not always be necessary to operate the present process efficiently. Typical pretreatment of the wastewater includes one or more of clarification, grit removal, fat and grease removal and pre-sedimentation.

The inventors found that the sludge that is formed in and circulates through the process is mainly granular. In step (c), specifically the fast settling sludge (or "heavy sludge") is selected and fed to step (a), where it is contacted with the highest concentration of organic nutrients as present in the incoming wastewater. As the uptake of nutrients by the sludge is promoted by the anaerobic conditions during step (a), the growth of the granular sludge is stimulated in the process according to the invention. The sludge contains microorganisms as common for sludge that is present in and produced by wastewater treatment plants. Although conventional wastewater treatment plants contain sludge flocs, the inventors found that with the present configuration of the wastewater treatment system, the sludge grows in granular form instead of in flocs. Nevertheless, minor amounts of floccular sludge may be present within the wastewater treatment system according to the invention. As such floccular sludge is not subjected to step (a), its growth is not promoted and the fraction of floccular sludge typically remains small to negligible. The present process runs smoothly with such minor amounts of floccular sludge. In view of the presence of microorganisms, the sludge present in the system according to the invention may also be referred to as "active sludge". The microorganisms needed for the process according to the invention can be found in the sludge of conventional wastewater treatment plants. They do not need to be isolated, since the conditions specified ensure that these microorganisms remain part of the sludge granules. The conditions of the process according to the invention give rise to the formation of sludge granules, which are significantly larger and denser than the sludge flocs obtained in conventional wastewater treatment plants. The sludge granules typically have an average settling velocity of above 1 m/h, preferably above 5 m/h or even above 10 m/h, compared to the settling velocity of at most 1 m/h for sludge flocs. The average settling velocity of sludge suspended in water is defined herein as the velocity equal to the maximum upflow speed generated in the sludge/water suspension at which substantially no sludge is present in the top effluent. Settling velocities or settling velocities are commonly determined in the art. A typical procedure for determining the average settling velocity is the measurement of the speed in m/h of the downward movement of the sludge front in a non-agitated vessel. This measurement may occur within the system, e.g. in the anaerobic tank or in the aerobic tank (when the inflow of oxygen is stopped during the measurement), or a sample of the sludge/water mixture may be transferred to a laboratory vessel. The further measure well-known in the art for the average settling velocity is the sludge volume index (SVI). SVI is defined as the volume (in ml) occupied by 1 gram of sludge after a certain time of settling. Typical values for the ratio of the SVI after 5 minutes of settling (SVI-5) over the SVI after 30 minutes of settling (SVI-30) for the granular sludge are below 3, typically in the range 2-2.8, more typically about 2.5, while conventional floccular sludge has a SVI-5/SVI-30 ratio above 3.

When the concentration of fast settling sludge within the system is relatively small, e.g. during start-up of the system, the amount of fast settling sludge that is selected as the second portion in step (c) is relatively small, but since a larger part of sludge will be selected as first portion, the total content of sludge in the system remains sufficiently high. As only fast settling sludge is subjected to step (a), this sludge portion will grow in size. The amount of fast settling sludge that is selected as the second portion in step (c) will thus increase. When the process according to the invention runs in a steady state, the second portion selected in step (c) will be much larger, while the additional sludge portion, i.e. the first portion selected in step (c) which is added during step (b), is relatively smaller.

In order to allow unhindered passage of the fast settling sludge, it is preferred that the transition between the anaerobic zone of step (a) and the aerobic zone of step (b) is barrier-free. Likewise, it is preferred that the transition between the aerobic zone of step (b) and the sludge selector of step (c) is barrier-free. Likewise, it is preferred that the transition between the aerobic zone of step (b) and the separator of step (d) is barrier-free. In a preferred embodiment, the mixture transfers barrier-free from step (a) to (b), from step (b) to (c) and from step (b) to (d). Herein, "barrier-free" refers to the absence of physical barriers, such as height differences (thresholds, raises, etc) and pumps, between the various zones, tanks or modules within the system according to the invention, such that even the fast settling sludge that is formed in the present system is easily and without hindrance capable of circulating through the system. Since fast settling sludge has a tendency to accumulate at the bottom of a tank, such an effective flow of the sludge/water mixture is obtained when the transitions between the tanks are barrier-free. Such barrier-free transitions typically take the form of openings in the wall separating the units. For efficient circulation of fast settling sludge throughout the system, it is preferred that the openings are located in the bottom part of the wall. In other words, an opening exists between the bottom of the units and the wall separating the units. As such, the barriers for the heavy fast settling sludge to circulate through the system are eliminated as much as possible.

Steps (a) and (b): Anaerobic and Aerobic Wastewater Treatment

The use of anaerobic and aerobic zones for the treatment of wastewater is known in the art. Herein, a mixture of wastewater and sludge is first subjected to an anaerobic zone and subsequently transferred to an aerobic zone. As wastewater treatment typically occurs in tanks, the anaerobic zone may also be referred to as anaerobic tank and the aerobic zone may also be referred to as the aerobic tank. The sequence of an upstream anaerobic zone and a downstream aerobic zone is used to convert organic matter present in the wastewater into sludge, which is accomplished by microorganisms present in the sludge. The use of an anoxic tank in between the anaerobic and the aerobic zones is not required, as the interior of the sludge granules remains anaerobic or anoxic throughout the entire process. Also, recycles of sludge/water mixtures from the aerobic zone to the anoxic zone and/or from the anoxic zone to the anaerobic zone are not required, while purification of the wastewater remains effective. Eliminating such recycles greatly improves the efficiency of the process, as mixing of treated wastewater with wastewater that is yet to be treated is avoided. As such, the concentration of organic nutrients beyond step (a) remains very low.

The sludge that is used in step (a) to be contacted with the incoming wastewater is fast settling sludge obtained as second portion in step (c). This second portion contains sludge with excellent settling properties, which is selectively collected during step (c) for use in step (a). In the process according to the invention, this fast settling sludge is mainly granular, and by subjecting specifically this fast settling sludge to be subjected the anaerobic zone with the incoming wastewater, the growth of sludge granules is selectively promoted. Fast settling sludge is contacted with the incoming wastewater having the highest content of organic matter, which promotes the growth thereof. As such, the sludge that is present within the wastewater system is mainly or even exclusively in granular form. Keeping the content of fast settling sludge as high as possible is the main objective of the process according to the invention, as the presence of fast settling sludge greatly facilitates the further steps of the process, in particular the separation of step (d). To this end, the recycling of slow settling (non-granular) sludge to step (a) should be avoided as much as possible. This is accomplished by sludge selection step (c), as described hereinbelow. As such, the slow settling sludge is not contacted with minute amounts of organic nutrients only, as those are mainly consumed in step (a), and is thus the growth thereof is restrained as much as possible. Thus, the growth of fast settling sludge is promoted in step (a), while the growth of slow settling sludge is reduced as it is not subjected to an anaerobic zone. This effect is further enhanced by the elimination of recycles, as discussed above, as the fast settling sludge is exposed to the highest possible concentration of organic nutrients during step (a), while the contact of slow settling sludge with organic matter is limited as much as possible.

Wastewater, which is optionally pretreated, is first subjected in step (a) to the anaerobic zone of the wastewater treatment process, wherein it is contacted with the fast settling sludge that is selectively collected in step (c). Thus, within the anaerobic zone a mixture of wastewater and fast settling sludge is obtained. In the anaerobic zone, the presence of molecular oxygen is excluded, although traces of oxygen, such as oxygen dissolved in the wastewater may be present without hampering the process. The conditions during step (a) are referred to as "anaerobic" as no oxygen is added. Within the anaerobic zone, the conditions and residence time of the wastewater are such that the sludge granules are capable of taking up organic nutrients from the incoming wastewater. These organic nutrients are typically stored within the microorganisms in the form of polymers, such as poly-beta-hydroxybutyrate (PHB). Typical average residence times for the mixture of sludge and water in the aerobic zone of step (a) are 15 min-5 h, preferably 30 min-2 h.

The mixture of wastewater and sludge obtained at the end of step (a) is then transferred to the aerobic zone of step (b), to which molecular oxygen is supplied (aeration), e.g. using aerators as known in the art. The water subjected to step (b) is depleted in organic nutrients, compared to the incoming wastewater. Preferably, no anoxic zone is present in between the anaerobic and the aerobic zones and the aerobic zone of step (b) directly follows the anaerobic zone of step (a). During step (b), at least one additional sludge fraction is added to the mixture, i.e. the first portion of the sludge originating from step (c). Optionally, at least part of the separated sludge originating from step (d) is also added during step (b). These additional sludge fractions are typically added at the beginning of step (b) as common in the art, such that the sludge resides for a substantial period of time in the aerobic zone. Average residence times of the mixture of sludge and water in the aerobic zone of step (b) may vary greatly, depending on e.g. the extent and type of pollution in the incoming wastewater, and are typically 30 min-3 days, preferably 1 h-2 days. During step (b), an oxygen comprising gas, typically air, is introduced in the mixture of sludge and water. Under such aerobic conditions, ammonium that may be present in the wastewater, is converted into nitrate and/or nitrite (nitrification). As the interior of the sludge granules remains anaerobic, the stored organic nutrients may be reacted with nitrate or nitrite to form nitrogen gas (denitrification), which is expelled to the environment. Thus, due to the presence of sludge in granular form, nitrification and denitrification may occur in the same zone, eliminating the need of an anoxic zone as well as of recycles from the aerobic zone to the anoxic zone and of the anoxic zone to the anaerobic zone. Aeration of the aerobic zone is performed at such a rate that the concentration of dissolved molecular oxygen in the wastewater during step (b) is preferably at least 0.05 and more preferably at least 0.1 mg/ml, while it is preferably not higher than 5 mg/ml, more preferably not higher than 2 mg/ml. Using such an oxygen supply, both the nitrification and denitrification processes occur effectively and nitrogen is effectively removed from the wastewater.

The mixture of (waste)water and sludge resides in the anaerobic and aerobic zones of steps (a) and (b) for a sufficient amount of time to allow effective uptake and/or removal of organic nutrients, nitrogen and phosphorus from the incoming wastewater. At the end of step (b), the mixture of sludge and water is divided over a first part that is fed to sludge selection step (c) and a second part that is fed to separation step (d). In order to operate the process smoothly in continuous mode, it is preferred that the amount of the mixture that is fed to step (c) remains substantially constant, while the amount that is led to step (d) varies with the volume of incoming wastewater in step (a). As such, the sludge selection step is capable of operating completely independent of the inflow of wastewater, which is crucial for continuous operation. Wastewater treatment plants typically have to cope with great variations in inflow of wastewater. For example, during a period of heavy rainfall, the inflow of wastewater may be greatly increased compared to during periods of relative drought. Typically, the respective amounts of the first and second part is governed by the area of the passages, through which the mixture flows from step (b) to step (c) or (d) respectively. During operation, the respective amounts of the first and second part can be influenced if desired, by adjusting the operation parameters of the sludge selector in step (c), such as by adjusting the upflow in the upflow reactor.

Step (c): Sludge Selection

In step (c), a first part of the sludge originating from step (b) is subjected to a sludge selection step, wherein sludge is selected based on settling velocity, and a first portion of slow settling sludge and a second portion of fast settling sludge are collected. Herein, "selected" refers to the separation of two or more portions of sludge. The average settling velocity of the second portion is greater than the settling velocity of the first portion, preferably at least 2 times as high and more preferably at least 5, or even at least 10 times as high. The first portion is returned to step (b) and the second portion is returned to step (a). Such sludge selection may be performed by any means known in the art to separate the solid particles in a suspension based on weight or settling velocity. Suitable sludge selectors include upflow reactors and lamella clarifiers. Conveniently, an upflow reactor is employed. Such means may be integrated within the aerobic zone of step (b), or the first part of the sludge may be transferred to the upflow reactor. Herein, the average settling velocity of the fast settling sludge is typically at least two times as high as the average settling velocity of the slow settling sludge, preferably at least five times as high or even at least ten times as high. The average settling velocity of the fast settling sludge is typically above 1 m/h, preferably above 5 m/h, most preferably above 10 m/h, while the average settling velocity of the slow settling sludge is typically at most 1 m/h, or even less than 0.5 m/h. Settling velocities above 5 m/h or even above 10 m/h are indicative of granular sludge, while sludge flocs typically settle at an average speed of at most 1 m/h. Even though there is no practical limit to the average settling velocity of the fast settling sludge, it typically is not higher than 25 m/h. In a preferred embodiment, the settling velocity is varied in the process within the range of 1-25 m/h. This way the built-up of sludge blankets can be reduced. In one embodiment, the settling velocity is varied within the above range as a cyclic event. In case an upflow reactor is used in step (c), the average settling velocity of the fast settling sludge is preferably defined as greater than the speed of the upflow at which the upflow reactor operates, while the average settling velocity of the slow settling sludge is then defined as being smaller than the speed of the upflow.

At the end of step (b), a suspension of sludge in water is present within the system. Conveniently, the stream of the sludge/water mixture is divided into two parts, one of which (i.e. the first part) is subjected to step (c) and one (i.e. the second part) to step (d). Although it is essential that part of the sludge is subjected to step (c), the sludge is conveniently subjected to step (c) as a mixture of sludge and water, as it is present at the end of step (b). At the end of the aerobic zone of step (b), typically a passage to the upflow reactor of step (c) is provided, such that the first part of the sludge can flow unhindered to the upflow reactor. It is not required for proper operation of the process according to the invention that all the sludge present at the end of step (b) is subjected to sludge selection step (c). As such, the capacity of the sludge selector employed in step (c) can be reduced, but at the same time a significant portion of fast settling sludge is collected and returned to step (a), such that granular sludge is effectively formed and maintained in the system.

Importantly, step (c) is performed independently from the inflow of wastewater, which may vary greatly over time. Conveniently, the absolute amount of the first part of the sludge originating from step (b), which is subjected to step (c), is kept substantially constant over time. In other words, step (c) is preferably operated with a substantially constant feed rate of the first part of the mixture of step (b). The concentrated stream of sludge of the second portion that is obtained in step (c) and returned to step (a) is constant and independent from the flow of incoming wastewater. As such, the present process is perfectly capable of coping with large variations in incoming wastewater flows typical for wastewater treatment plants and at the same time continues to operate smoothly while forming and/or maintaining granular sludge. The relative amount of the first part of sludge, which is subjected to step (c), may thus vary greatly, depending on the inflow of wastewater during step (a). As appreciated by the skilled person, the ratio of sludge to waste, that is present in the incoming wastewater in step (a), should be kept more or less constant, and may depend on the size of the wastewater treatment plant.

By recycling of the fast settling sludge to step (a), this sludge is in contact with the highest amount of organic matter, i.e. as contained in the incoming wastewater, which specifically promotes the growth of the fast settling sludge. As such, sludge granules are formed and subsequently maintained in the system by cycling from step (a), via step (b) to step (c) and subsequently back to step (a). The organic matter present in the incoming wastewater is converted into granular sludge during step (a), while slower settling sludge, such as sludge flocs, is only subjected to step (b), and thus the growth thereof is not promoted. Growth promotion of specifically the fast settling sludge is a marked improvement over prior art wastewater treatment processes. The inventors surprisingly found that selectively promoting the growth of the fast settling sludge ensures granular sludge is formed and maintained in the system. Herein, it is essential that the second portion containing fast settling sludge is contacted with the incoming wastewater prior to being contacted with oxygen, such as in the aerobic zone of step (b). The fast settling sludge is, together with the incoming wastewater, subjected to the anaerobic zone of step (a). To effectuate this contacting of fast settling sludge and wastewater in step (a), the second portion may be returned to the anaerobic zone itself or to a selector located upstream of the anaerobic zone. Such selectors for mixing incoming wastewater and active sludge are known in the art. Within the selector, anaerobic conditions are present. Preferably, the second portion is returned directly to the anaerobic zone of step (a).

The second part of the sludge originating from step (b) is subjected to step (d), as described hereinbelow. Preferably, the first part of the sludge, which is subjected to step (c) and the second part of the sludge, which is subjected to step (d), together make up substantially all of the total amount of sludge present at the end of step (b). Thus, all of the sludge present at the end of step (b) is subjected to step (c) or to step (d). In other words, it is preferred that the stream of sludge and water is split in two parts at the end of step (b), a first part that is subjected to step (c) and a second part that is subjected to step (d). The total amount of sludge that is present at the end of step (b) is formed by the sludge that originated from step (a) and the sludge that is formed during step (b), as well as the additional sludge fraction that originates as a first portion from step (c) and that is added during step (b) and optionally the additional sludge fraction that originates from step (d) and that is added during step (b).

Sludge selection step (c) involves the collection of at least two portions, preferably three portions, of the sludge that is subjected to step (c). The first portion contains slow settling sludge and the second portion contains fast settling sludge. Herein, "slow settling" and "fast settling" refers to the average settling velocity of the sludge in one portion compared to the other portion. Thus, the average settling velocity of the second portion is greater than the settling velocity of the first portion. The first portion is returned to step (b) and the second portion is returned to step (a), typically using a pump employing an upward stream of air or liquid, such as an airlift pump, or a screw pump. Using such a pump, the mechanical stress is eliminated as much as possible which enables fast circulation of the fast settling sludge through the system and prevents damage of the sludge granules. Typically, the faster the fast settling sludge is capable of circulating through the system the more granular sludge is formed and maintained in the system. Typically, the second portion containing the fast settling sludge is obtained in concentrated form, which reduces the total volume that is contacted with the wastewater in step (a) is relatively small, such that the total volume of the anaerobic zone may be significantly reduced, e.g. up to 40% smaller in volume, compared to conventional continuous wastewater treatment facilities. Moreover, in view of the independence of step (c) from the inflow of wastewater, the present process enables a continuous flow of high quality sludge to be contacted with the wastewater in step (a). For the most optimal formation of granular sludge, it is preferred that substantially all of the fast settling sludge collected as the second portion in step (c) is returned to step (a). As such, the granular sludge is allowed to grow optimally. As described above, step (c) can operate independently of the wastewater inflow. Thus, the sludge cycle of consecutive steps (b)→(c)→(a) is operable independent of wastewater inflow, which allows for continuous operation of the sludge selection step and ensures optimal growth of specifically fast settling sludge.

Optionally, a third portion is collected during step (c), which is a waste sludge stream. The waste sludge stream of the third portion contains slow settling sludge, like the first portion. Whether or not and to what extent a third portion is collected mainly depends on the sludge concentration within the system. As such, the sludge concentration is suitable kept more or less constant and when necessary additional sludge is easily discharged from the system as the third portion. Preferably, substantially all of the sludge that is subjected to step (c) ends up in the first, second or optional third portion. The third portion is waste sludge, which is a by-product of the wastewater treatment according to the invention and is thus discharged from the system. It may be used or processed as deemed fit. Typically, it is subjected to a sludge treatment step as known in the art. The first portion may be combined with settled sludge originating from step (d), such that a combined sludge fraction containing the third portion originating from step (c) and settled sludge originating from step (d), optionally from which sludge that is recycled to step (b) is removed as described below, may be subjected to sludge treatment. Conveniently, the third portion is collected as a separate portion and is discharged from the sludge separator via a separate outlet equipped with an additional pump. In one embodiment, the third portion may be used in inocculate or start up other wastewater treatment processes.

In a preferred embodiment, an upflow reactor is used for the sludge selection of step (c). Upflow reactors are known in the art and any type may be used in step (c). In the upflow reactor, the sludge particles are separated based on the speed of settling. Sludge particles that settle quickly accumulate at the bottom of the upflow reactor. Since granular sludge has excellent settling properties, it accumulates at the bottom of the upflow reactor, and from there recycled to step (a) of the process according to the invention. Any sludge with weak settling properties, which is advantageously not contained in the process in large quantities, and which at least should not be recycled to step (a) of the present process, is collected from higher in the upflow reactor. The upflow reactor preferably operates with an upflow speed of 1-25 m/h, more preferably 2-15 m/h, most preferably 3-8 m/h. Typically, a pump as known in the art, e.g. an axial-flow pump, placed near the top of the upflow reactor, is used to effectuate such upflow. The first portion is collected from the top half of the upflow reactor and a second portion of the sludge is collected from the bottom of the upflow reactor. In other words, the outlet for discharging the first portion from the upflow reactor is located at 50% of the total height of the reactor or above and "from the top half" is synonymous with "from the upper 50%". Thus, the first portion is collected at 50-100% of the total height of the upflow reactor, preferably at 75-100% of the total height, most preferably at the top of the reactor. The optional third portion is also collected at the top half of the upflow reactor. The outlet for discharging the first and optionally third portion may also take the form of an overflow at the top of the upflow reactor. Likewise, the outlet for discharging the second portion from the upflow reactor is located at 25% of the total height of the reactor or below and "from the bottom" is synonymous with "from the lower 25%", preferably the second portion is collected from the lower 10% of the upflow reactor, most preferably the outlet for collecting the second portion is located in the bottom of the upflow reactor. Using an upflow reactor, the second portion of sludge is collected as a concentrated stream of sludge in water.

Step (d): Separation

In step (d), the second part of the mixture of sludge and water originating from step (b) is separated into sludge and treated water. Typically, the second part is the remainder of the mixture that is present at the end of step (b) after the first part has been transferred to the sludge selector. Separation is typically based on settling of the sludge particles and is preferably performing using a settling tank or an upflow reactor. Step (d) may thus also be referred to as a settling step. The water that is subjected to the process according to the invention and that is discharged from the separator is referred to as "treated water". In view of the presence of granular sludge within the wastewater treatment system, the capacity of the upflow reactor or the settling tank may be down-scaled significantly, compared to wastewater treatment plants wherein sludge flocs are used. Separating sludge from water is known in the art.

In settling step (d), the sludge in the second part of the mixture of sludge and water originating from step (b) is allowed to settle. Such a settling step, during which the sludge is separated from the treated water, is common for conventional wastewater treatment plants. However, because of the presence of granular sludge, instead of sludge flocs, the settling tanks wherein step (d) is performed may be much smaller (for example about one fifth in area for the same wastewater input) compared to the conventional settling tanks needed for settling sludge flocs. The incoming mixture of water and sludge originating from step (b) resides for a sufficient amount of time in the settling tank or upflow reactor to allow settlement of the sludge. Once the sludge is essentially settled, the water is clarified from sludge and may be considered clean and discharged to the environment, although for some applications and/or locations, additional further treatment such as removal of metals may be desired. Whether or not further treatment takes place is irrelevant for the present invention.

Typically, the settling of step (d) occurs in a settling tank. Any type of settling tank known in the art may be used in the present process. Settling tanks typically have a conical shape with a wide upper part and a narrow bottom. Sludge particles accumulate at the bottom, from which it is collected, preferably using an outlet located in the bottom of the settling tank. Treated water is typically discharged via an outlet at the top of the settling take, preferably using an overflow.

In case an upflow reactor is used in step (d), the settling of the sludge is accelerated using an upflow. Herein, the second part of the mixture of sludge and water originating from step (b) is subjected to an upflow reactor, wherein the sludge particles settle at the bottom while the water depleted in sludge emerges at the top of the upflow reactor. This water is discharged as treated water. The upflow reactor preferably operates with an upflow speed of 0.5-10 m/h, more preferably 1-5 m/h. Such upflow speeds are 2 to 10 times greater as upflow speeds commonly employed in prior art settling steps, which further improves the efficiency of the present process. Such upflow speeds can be employed in the present process, as the great majority of the sludge is granular and settles quickly. Using a settling tank or an upflow reactor operated with such an upflow, all sludge—granular or not—is allowed to settle, such that the treated water is clarified from all sludge before it is discharged from the system. Typical residence times of the mixture of sludge and water in the upflow reactor are 5 min-2 h, preferably 15 min-1 h. Such residence times are much shorter than for prior art processes, wherein residence times over 2 h, typically 4-10 h, are common. In view of the granular nature of the sludge, such short residence times still allow for effective separation of sludge and treated water.

The sludge that is separated is preferably at least partly returned to the aerobic zone of step (b). The remainder is a by-product of the wastewater treatment according to the invention and is thus discharged from the system. It may be used or processed as deemed fit. Advantageously the discharged sludge may be used to start up or improve settling in other or conventional or granule-based wastewater treatment. Typically, discharged sludge is subjected to a sludge treatment step as known in the art. As the sludge obtained by the process according to the invention contain valuable components, these may be extracted from the sludge. The skilled person knows how to determine the amount of sludge that should be returned to step (b) in order to run the process effectively.

The treated water that is discharged from the separator in step (d) is the major product of the process according to the invention. The treated water is depleted in organic matter (organic nutrients) compared to the incoming wastewater. The treated water discharged from step (d) may be discharged to the environment, further purified or used as deemed fit.

System

The invention further concerns an apparatus or system specifically designed to implement the process according to the invention. In the system according to the invention, at least four, preferably at least five or even six, units are in fluid connection with each other. Herein, each unit may be a separate entity or two or more units may be integrated within a single unit. Preferably, units (b) and (c) are integrated in a single unit and the remaining units are separate units, which are distinguishable as such in the system. The system for performing the process according to the invention may also be referred to as a wastewater treatment plant or sewage treatment plant or may be integrated within a wastewater treatment plant or sewage treatment plant. The system according to the invention is described with reference to the accompanying FIGURE.

The system according to the invention comprises:
(a) an anaerobic tank, comprising one or more inlets for receiving wastewater and for receiving fast settling sludge originating from outlet (c3) and an outlet (a3) for discharging a mixture of wastewater and sludge to tank (b);
(b) an aerobic tank, comprising an inlet (b1) for receiving the mixture of wastewater and sludge originating from outlet (a3), an outlet (b2) for discharging a first part of a mixture of water and sludge to sludge selector (c), an outlet (b3) for discharging a second part of the mixture of water and sludge to separator (d) and an inlet (b4) for receiving a mixture of slow settling sludge originating from outlet (c2);
(c) a sludge selector, comprising an inlet (c1) for receiving the first part of the mixture of water and sludge originating from outlet (b2), an outlet (c2) for discharging a first portion of slow settling sludge to tank (b) and an outlet (c3) for discharging a second portion of fast settling sludge to tank (a) and means (c4) for selecting sludge based on settling velocity; and
(d) a separator for separating sludge from a mixture of sludge and water, comprising an inlet (d1) for receiving the second part of the mixture originating from outlet (b3), a first outlet (d2) for discharging treated water and a second outlet (d3) for discharging separated sludge, In the system according to the invention, the different units are interconnected, i.e. the outlet of one unit is in fluid connection with the inlet of another unit. As such, constant flow of fluids, such as sludge/water mixtures, through the system is enabled. Thus, outlet (a3) is in fluid connection with inlet (b1), outlet (b2) is in fluid connection with inlet (c1), outlet (b3) is in fluid connection with inlet (d1), outlet (c2) is in fluid connection with inlet (b4), and outlet (c3) is in fluid connection with an inlet of unit (a), preferably with inlet (a2). Outlet (d3) is preferably in fluid connection with inlet (b5), as described hereinbelow. Herein, fluid connections may for example take the form a conduit, or the outlet of one unit and the inlet of another unit together form an opening in the wall separating the two units. Preferably, outlet (a3) and inlet (b1) together form an opening in the wall separating units (a) and (b). Preferably, outlet (b2) and inlet (c1) together form an opening in the wall separating units (b) and (c). Preferably, outlet (b3) and inlet (d1) together form an opening in the wall separating units (b) and (d). For efficient circulation of granular sludge throughout the system, it is preferred that the openings are located in the bottom part of the wall. In other words, an opening exists between the bottom of the units and the wall separating the units. As such, the barriers for the fast settling sludge to circulate through the system are as much as possible eliminated.

Unit (a) is an anaerobic tank or vessel as known in the art, wherein wastewater and sludge are contacted. Unit (a) comprises one or more inlets for receiving wastewater and for receiving sludge from outlet (c3) of unit (c). The one or more inlets may for example be two inlets, one for receiving the incoming wastewater and one for receiving the sludge, or one inlet for receiving a mixture of the incoming wastewater and the sludge. In one embodiment, the incoming wastewater, which may originate from a pretreatment facility, and the sludge originating from outlet (c3) of unit (c) are mixed upstream of unit (a), typically in a selector, and unit (a) comprises one inlet for receiving the mixture of wastewater and sludge from the selector. In another, more preferred, embodiment, unit (a) comprises an inlet (a1) for receiving wastewater, which may originate from a pretreatment facility, and an inlet (a2) for receiving sludge from outlet (c3) of unit (c). In unit (a), wastewater and granular sludge are contacted to effectuate uptake of organic nutrients present in the wastewater into the sludge particles, thus enabling sludge growth. Outlet (a3) of unit (a) is for discharging the mixture of wastewater and granular sludge to unit (b). Outlet (a3) together with inlet (b1) typically take the form of an opening in the wall, preferably in the bottom part thereof, separating tanks (a) and (b).

Unit (b) is an aerobic tank or vessel as known in the art, wherein the mixture of wastewater and granular sludge originating from unit (a) is received via inlet (b1). Outlet (a3) is in fluid connection with inlet (b1), preferably in the form of an opening in the bottom of the wall separating both units. Unit (b) further comprises an outlet (b2) for discharging a first part of a water/sludge mixture to an upflow reactor (c) and an outlet (b3) for discharging a second part of the water/sludge mixture to unit (d), wherein the second part is typically the remainder of the water/sludge mixture. Outlet (b2) together with inlet (c1) typically take the form of an opening in the wall, preferably in the bottom part thereof, separating tank (b) and upflow reactor (c). Outlet (b3) together with inlet (d1) typically take the form of an opening in the wall, preferably in the bottom part thereof, separating tank (b) and separator (d). Unit (b) further comprises an inlet (b4) for receiving the third portion of the sludge originating from outlet (c2) of unit (c), and preferably a further inlet (b5) for receiving at least part of the separated sludge originating from unit (d). In unit (b), wastewater and granular sludge are (further) contacted to effectuate nitrification and denitrification. Being an aerobic tank, unit (b) further comprises means as known in the art for introducing oxygen, typically air, into the tank.

Unit (c) is a sludge selector, such as a lamella clarifiers or an upflow reactor. Unit (c) may be integrated in unit (b) or may be located downstream thereof, preferably it is integrated in the aerobic tank of unit (b). Unit (c) comprises an inlet (c1) for receiving the first part of the water/sludge mixture from unit (b). Unit (c) further contains means (c4) for selecting sludge based on settling velocity, wherein the first part of the water/sludge mixture is subjected to sludge selection. Unit (c) contains at least two outlets, a first outlet (c2) for discharging a first portion of the sludge from the system and a second outlet (c3) for discharging a second portion of the sludge. Outlet (c2) is in fluid connection with inlet (b4). Outlet (c3) is in fluid connection with inlet (a2). The connection between outlet (c3) and inlet (a2) is preferably equipped with a pump, which is capable of pumping the second portion of sludge to the anaerobic tank of unit (a). Preferably, a pump employing an upward stream of air or liquid, such as an airlift pump, or a screw pump is used, such that mechanical stress of the fast settling sludge is as much as possible eliminated. Unit (c) preferably comprises a third outlet (c5) for discharging a third portion of the sludge. Outlet (c5) is for discharging waste sludge from the system according to the invention, and may be in fluid connection with a sludge treatment facility. The fluid connection originating from outlet (c5) may be joined with the fluid connection from outlet (d3), wherein the streams originating from both outlets are combined in a single stream which may be in fluid connection with a sludge treatment facility.

In a preferred embodiment, unit (c) is an upflow reactor. In the upflow reactor, inlet (c1) is preferably located in or near the bottom of reactor (c), more preferably in the lower 25% of the total height of the reactor. In one embodiment, the upflow reactor (c) may comprise a pump, typically an axial-flow pump, located near the top, such as at 75% of the total height of the reactor or above, preferably at least 90% of the total height of the reactor. If such a pump is used, it is preferably capable of operating the upflow reactor with an upflow speed of 1-25 m/h, more preferably 2-15 m/h, most preferably 3-8 m/h. In any case it is preferred that upflow speed can be varied within the above ranges, preferably to avoid sludge blankets. Outlet (c2) is located in the top half of the upflow reactor and outlet (c3) in the lower 25% of the reactor. Thus, outlet (c2) for discharging a first portion of the sludge to unit (b) is located at 50% of the total height of the reactor or above, preferably at 75-100% of the total height, most preferably at the top of the reactor. Outlet (c3) for discharging a second portion of the sludge to unit (a) is located at 25% of the total height of the reactor or below, preferably at 0-10% of the total height, most preferably in the bottom of the reactor. Outlet (c5) for discharging a third portion of the sludge is, when present, located in the top half of the upflow reactor, preferably at 75-100% of the total height, most preferably at the top of the reactor. Outlet (c4) may be equipped with an additional pump or may take the form of an overflow.

Unit (d) is a separator for separating sludge from treated water. The separator is preferably a settling tank or an upflow reactor, more preferably an upflow reactor. Any settling tank or any upflow reactor as known in the art may be used. Typical settling tanks have a conical shape with a narrow bottom and a wide top. When an upflow reactor is used, it is preferably capable of operating with an upflow speed of 0.5-10 m/h, more preferably 1-5 m/h. Unit (d) comprises an inlet (d1) for receiving the second part of the water/sludge mixture from unit (b). Inlet (d1) is typically located near the bottom of the separator. Outlet (b3) is in fluid connection with inlet (d1). Unit (d) further comprises a first outlet (d2) for discharging treated water, which is typically an overflow, and a second outlet (d3) for discharging settled sludge. The second outlet (d3) is typically located near the bottom or even in the bottom of the separator, and is preferably in fluid connection with inlet (b5) of unit (b). As such, at least part of the settled sludge is conveniently returned to the aerobic tank of unit (b). The fluid connection originating from outlet (d3) may comprise means to discharge part of the settled sludge from the system as waste sludge, which may be combined with the fluid connection originating from outlet (c5) and which may be in fluid connection with a sludge treatment facility.

In a preferred embodiment, the system according to the invention comprises:

(a) an anaerobic tank, comprising an inlet (a1) for receiving wastewater, an inlet (a2) for receiving fast settling sludge from outlet (c3) of unit (c) and an outlet (a3) for discharging a mixture of wastewater and sludge;

(b) an aerobic tank, comprising an inlet (b1) for receiving the mixture of wastewater and sludge originating from outlet (a3), an outlet (b2) for discharging a first part of a mixture of water and sludge to sludge selector (c), an outlet (b3) for discharging a second part of the mixture of water and sludge to separator (d), an inlet (b4) for receiving a mixture of water and sludge from outlet (c2) and an inlet (b5) for receiving sludge from outlet (d3);

(c) an upflow reactor capable of operating with an upflow speed of 1-25 m/h, comprising an inlet (c1) for receiving the first part of the mixture of water and sludge originating from outlet (b2), an outlet (c2), located in the top half of the upflow reactor, for discharging a first portion of slow settling sludge to tank (b), an outlet (c3), located in or near the bottom of the upflow reactor for discharging a second portion of fast settling sludge to tank (a) and an outlet (c5), located in the top half of the upflow reactor, for discharging a third portion of slow settling sludge to tank (b); and (d) an upflow reactor for separating sludge from treated water, capable of operating with an upflow speed of 0.5-10 m/h, comprising an inlet (d1) for receiving the second part of the mixture of water and sludge from outlet (b3), a first outlet (d2) for discharging treated water and a second outlet (d3) for discharging separated sludge, wherein outlet (a3) is in fluid connection with inlet (b1), outlet (b2) is in fluid connection with inlet (c1), outlet (b3)

is in fluid connection with inlet (d1), outlet (c2) is in fluid connection with inlet (b4), outlet (c3) is in fluid connection with inlet (a2) and outlet (d3) is in fluid connection with inlet (b5).

The invention claimed is:

1. A continuous process for treatment of wastewater, comprising:
        (a) subjecting wastewater to an anaerobic zone, to obtain a mixture of wastewater and sludge;
        (b) subjecting the mixture originating from step (a) to an aerobic zone to obtain a mixture of wastewater and sludge;
        (c) subjecting a first part of the mixture originating from step (b) to a sludge selection step, wherein sludge is selected based on average settling velocity, and a first portion containing slow settling sludge and a second portion containing fast settling sludge are collected, wherein the average settling velocity of the fast settling sludge is greater than the average settling velocity of the slow settling sludge, and wherein the first portion is returned to step (b) and the second portion is returned to step (a); and
        (d) separating sludge from a second part of the mixture originating from step (b), to obtain treated wastewater.

2. The process according to claim 1, wherein the average settling velocity of the fast settling sludge is above 1 m/h while the average settling velocity of the slow settling sludge is at most 1 m/h.

3. The process according to claim 1, wherein the sludge selection of step (c) is performed in an upflow reactor, and/or wherein step (c) operates with a substantially constant feed rate of the first part of the mixture of step (b).

4. The process according to claim 3, wherein the upflow reactor is operated with an upflow in the range of 1-25 m/h.

5. The process according to claim 1, wherein in step (c) a third portion containing slow settling sludge is collected and discharged as waste sludge.

6. The process according to claim 1, wherein the mixtures transferred from step (a) to (b), from step (b) to (c) and from step (b) to (d) are transferred barrier-free.

7. The process according to claim 1, wherein at least part of the sludge originating from step (d) is returned to step (b).

8. The process according to claim 5, wherein the third portion of the sludge originating from step (c) and/or at least part of the sludge originating from step (d) are subjected to sludge treatment.

9. A system for treatment of wastewater, comprising:
        (a) an anaerobic tank (a), comprising one or more inlets for receiving wastewater and for receiving fast settling sludge originating from an outlet (c3) and an outlet (a3) for discharging a mixture of wastewater and sludge to an aerobic tank (b);
        (b) the aerobic tank (b), comprising an inlet (b1) for receiving the mixture of wastewater and sludge originating from the outlet (a3), an outlet (b2) for discharging a first part of a mixture of water and sludge to a sludge selector (c), an outlet (b3) for discharging a second part of the mixture of water and sludge to a separator (d) and an inlet (b4) for receiving a mixture of slow settling sludge originating from an outlet (c2);
        (c) the sludge selector (c), comprising an inlet (c1) for receiving the first part of the mixture of water and sludge originating from the outlet (b2), the outlet (c2) for discharging a first portion containing slow settling sludge to the aerobic tank (b), the outlet (c3) for discharging a second portion containing fast settling sludge to the anaerobic tank (a), and a sludge selector (c4) based on settling velocity; and
        (d) the separator (d) for separating sludge from a mixture of sludge and water, comprising an inlet (d1) for receiving the second part of the mixture originating from the outlet (b3), a first outlet (d2) for discharging treated water and a second outlet (d3) for discharging separated sludge,
    wherein the outlet (a3) is in fluid connection with the inlet (b1), the outlet (b2) is in fluid connection with the inlet (c1), the outlet (b3) is in fluid connection with the inlet (d1), the outlet (c2) is in fluid connection with the inlet (b4) and the outlet (c3) is in fluid connection with an inlet of the anaerobic tank (a).

10. The system according to claim 9, wherein the anaerobic tank (a) comprises a first inlet (a1) for receiving wastewater and a second inlet (a2) for receiving fast settling sludge originating from the outlet (c3), and wherein the second inlet (a2) is the inlet in fluid connection with the outlet (c3).

11. The system according to claim 9, wherein the sludge selector (c) is integrated in the aerobic tank (b).

12. The system according to claim 9, wherein the sludge selector (c) is an upflow reactor capable of operating with an upflow speed of 1-25 m/h.

13. The system according to claim 10, wherein the fluid connection between the outlet (c3) and the second inlet (a2) is equipped with a pump employing an upward stream of air or liquid or a screw pump.

14. The system according to claim 9, wherein the separator (d) is an upflow reactor capable of operating with an upflow speed of 0.5-10 m/h.

15. The system according to claim 9, wherein the outlet (a3) together with the inlet (b1) take the form of an opening in the bottom part of a wall separating the anaerobic and aerobic tanks (a) and (b).

* * * * *